United States Patent
Jan (10) Patent No.: US 8,755,251 B1
(45) Date of Patent: Jun. 17, 2014

(54) GROUND RODENT REPELLER

(71) Applicant: Tzu-Ying Jan, New Taipei (TW)

(72) Inventor: Tzu-Ying Jan, New Taipei (TW)

( * ) Notice: Subject to any disclaimer, the term of this patent is extended or adjusted under 35 U.S.C. 154(b) by 0 days.

(21) Appl. No.: 13/748,745

(22) Filed: Jan. 24, 2013

(51) Int. Cl.
*A01M 29/16* (2011.01)

(52) U.S. Cl.
USPC ........................................ 367/139

(58) Field of Classification Search
CPC ...................................... A01M 29/16
USPC .......... 367/139; 43/124; 116/22 A; 340/384.7
See application file for complete search history.

(56) References Cited

U.S. PATENT DOCUMENTS

| | | | | |
|---|---|---|---|---|
| 5,205,066 A | * | 4/1993 | Jan | 367/139 |
| 5,870,847 A | * | 2/1999 | Hsiao | 367/139 |
| 6,000,169 A | * | 12/1999 | Jan | 43/124 |
| 6,134,827 A | * | 10/2000 | Jan | 43/124 |
| 6,157,594 A | * | 12/2000 | Jan | 367/139 |
| D681,769 S | * | 5/2013 | Jan | D22/120 |
| D681,770 S | * | 5/2013 | Jan | D22/120 |
| D693,900 S | * | 11/2013 | Jan | D22/120 |
| D697,164 S | * | 1/2014 | Jan | D22/120 |

FOREIGN PATENT DOCUMENTS

TW           303600           4/1997

* cited by examiner

*Primary Examiner* — Daniel Pihulic
(74) *Attorney, Agent, or Firm* — Li & Cai Intellectual Property (USA) Office (57) ABSTRACT

A ground rodent repeller includes a main rod, a cover, a battery base and a control circuit board. One end of the main rod has an opening and a first screw thread. The cover has a second screw thread and a first locking part. The second screw thread and the first screw thread engage with each other. One end of the battery base has a second locking part, which engages with the first locking part of the cover. By this configuration, the components are designed for simple assembly, have a low production cost, can be promptly installed, and have ideal sealing and water proof effects.

10 Claims, 7 Drawing Sheets

GROUND RODENT REPELLER

BACKGROUND OF THE INVENTION

1. Field of the Invention

The present invention relates to a ground rodent repeller; in particular, to a repeller for repelling rodents by using audio frequencies.

2. Description of Related Art

Since ground rodents (such as groundhogs) like to dig the soil around roots of crop plants and tunnel extensive burrows, the growth of plants is directly damaged, and inhabitance of pests and rats are likely attracted, further causing plant diseases, creating losses and troubles for farmers. In current techniques, sound waves can be emitted at regular intervals to drive away underground rodents, thereby achieving the object of repelling rodents.

For example, Publication TW 303600 discloses a "Groundhog Repeller with Easily Replaceable Battery," including: a tube, an installation frame slidably disposed therein, a repeller unit disposed on the installation frame, and a top cover covering the top opening of the tube. A connection piece is connected between the top cover and the installation frame, enabling the installation frame to be pulled out of the tube in conjunction with the top cover, facilitating the replacing of battery of the repeller unit. Additionally, a screw passes through the top cover and a nut fixes the connection piece onto the underside of the top cover. Additionally, a handle is disposed at the head of the screw, and lies flat on the top cover when not in use so as to reduce its height of protrusion.

However, the groundhog repeller requires the handle to be turned about ten to twelve seconds during operation in order to loosen the screw with the nut, so that the top cover, waterproof pad and the tightening piece are loosened with gaps in between them, allowing a human hand to apply force on the handle to pull out the installation frame for battery replacement. The implication is that during operation, much time needs to be spent on turning the handle to form gaps between the various parts before they can be pulled out (because the top cover, waterproof pad and the tightening piece must be in a tightened state to be waterproof, the three components cannot be pulled out without first turning the handle to loosen the screw with the nut and gaps are formed between the three loosened components.)

Therefore, the groundhog repeller has a complicated and time consuming procedure for battery replacement, and a higher production cost due to the relatively high number of components. Moreover, the top cover, waterproof pad and tightening pad all have apertures for the screw to pass through. Since the device is installed outdoors for long periods of time and subject to indiscriminate weather, it is easily corroded. The constant tightening and loosening between the screw and the nut also causes wear. The aperture of the waterproof pad is easily stretched and deformed, eventually creating gaps for air and water to seep through and into the device, further leading to short-circuiting and corrosion of the circuit within the installation frame.

Hence, the present inventor believes the above mentioned disadvantages can be overcome, and through devoted research combined with application of theory, finally proposes the present disclosure which has a reasonable design and effectively improves upon the above mentioned disadvantages.

SUMMARY OF THE INVENTION

The object of the present disclosure is to provide a ground rodent repeller which has components designed for simple assembly, has a low production cost, is easy to install, and has a good waterproof ability.

In order to achieve the aforementioned objects, the present disclosure provides a ground rodent repeller, including: a main rod, on one end of which are disposed an opening and a first screw thread; a cover, on which are disposed a second screw thread and a first locking part, wherein the second screw thread and the first screw thread can be screwed with each other; and a battery base disposed within the main rod, wherein one end of the battery base has a second locking part for engaging with the first locking part of the cover.

The present disclosure has the following advantages:

The present disclosure includes a main rod, a cover, a battery base and a control circuit board. The components are designed for simple assembly. The production cost of the present disclosure is low. The cover and the battery base are connected by simple engagement. The installation of the present disclosure is prompt and easy.

The connection between the cover and the battery base of the present disclosure is hermetically sealed at an end of the main rod, does not have any aperture, and has ideal sealing and water proof abilities.

Operation of the present disclosure only requires the cover 2 to be turned for about 4 to 6 seconds in order to promptly pull the battery base 3 connected to the cover 2 out of the main rod 1, achieving the object of promptly replacing the battery.

In order to further the understanding regarding the present invention, the following embodiments are provided along with illustrations to facilitate the disclosure of the present invention.

DETAILED DESCRIPTION OF THE PREFERRED EMBODIMENTS

The aforementioned illustrations and following detailed descriptions are exemplary for the purpose of further explaining the scope of the present invention. Other objectives and advantages related to the present invention will be illustrated in the subsequent descriptions and appended drawings.

First Embodiment

Referring to FIG. 1 to FIG. 4, the present disclosure provides a ground rodent repeller, including a main rod 1, a cover 2, a battery base 3 and a control circuit board 4. The main rod 1 is a hollow rod, ideally but not necessarily made out of metal. The shape of the main rod 1 is likewise not limited, and can be for example a circular cylinder or other cylinders. An opening 11 is formed on a (top) end of the main rod 1, for the battery base 3 and the control circuit board 4 to be disposed through into the main rod 1.

A pointed end 12 can be formed on the other (bottom) end of the main rod 1, for inserting into the ground. The pointed end 12 can be integrated as one body with the main body 1 on the other end, or can be connected by assembly to the other end of the main rod 1. The end of the main rod 1 with the opening 11 formed thereon has a first screw thread 13. The first screw thread 13 can be a male thread or a female thread. The first screw thread 13 disclosed in the present embodiment is a male thread.

The cover 2 is a hollow cover, whose shape is not limited. A second screw thread 21 corresponding to the first screw thread 13 is formed on the cover 2. The second screw thread 21 can be a male thread or a female thread. The second screw thread 21 disclosed in the present embodiment is a female thread. The second screw thread 21 can be screwed with the first screw thread 13, such that the cover 2 hermetically seals the opening 11 of the main rod 1 by a screwing method.

A first locking part 22 is disposed on the cover 2, for engaging with the battery base 3. The structure of the first locking part 22 is not limited, and can be for example a locking groove or a locking body. The locking part 22 disclosed by the present embodiment is a locking groove A, whose shape can be a circle, a polygon, etc and not limited herein. The locking groove A disclosed in the present embodiment is a circular groove.

The interior of the cover 2 can have a seal piece 23 disposed thereat. The seal piece 23 can be a rubber gasket. The material and shape of the seal piece 23 is not limited. The seal piece 23 is disposed within the cover 2. When the cover 2 is screwed with the main rod 1, one end of the main rod 1 presses against the seal piece 23, such that the seal piece 23 is sandwiched between the cover 2 and the main rod 1, achieving sealing and water proof effects.

The battery base 3 can be disposed within the main rod 1. The battery base 3 has a battery compartment 31 for accommodating a battery 32. Conduction pieces 33 and 34 are disposed at two ends of the battery compartment 31, for contacting and electrically connecting to the battery 32.

The control circuit board 4 is disposed on the battery base 3. In the present embodiment, the battery base 3 has an accommodating space 35. The control circuit board 4 is disposed within the accommodating space 35, and is electrically connected to the conduction pieces 33 and 34, such that the electric power of the battery 32 can be transmitted to the control circuit board 4 through the conduction pieces 33 and 34. The control circuit board 4 can be an audio vibration circuit, for producing audio vibrations which passes through the main rod 1 and achieves the effect of repelling rodents. The form and structure of the control circuit board 4 is not limited, as long as it can produce audio frequencies (audio waves, sound) which can repel rodents. Since the control circuit board 4 is a common technique, it is not further described.

A second locking part 36 corresponding to the first locking part 22 is disposed at the battery base 3, for engaging with the cover 2. The structure of the second locking part 36 is not limited, and can be for example a locking body or a locking groove. The second locking part 36 disclosed by the present embodiment is a locking body C. The locking body C can be a circular or polygonal cylinder, the shape of which is not limited. The locking body C disclosed in the present embodiment is a circular cylinder.

The first locking part 22 of the cover 2 (such as the locking groove A) and the second locking part 36 of the battery base 3 (such as the locking body C) engage each other, such that the cover 2 can be connected to one end of the battery base 3 by an engagement method. Namely, the cover 2 and the battery base 3 are connected as one body.

Additionally, a guiding groove B can be disposed on the first locking part 22, and a guiding rail D can be disposed on the second locking part 36. The guiding groove B can be disposed on the inner surface of the locking groove A. The guiding rail D can be disposed on the outer surface of the locking body C. The guiding groove B and the guiding rail D work in conjunction in order to securely connect the cover 2 with the battery base 3. In another embodiment of the present disclosure, a guiding rail (not shown in the figure) can be disposed on the first locking part 22, and a guiding groove (not shown in the figure) can be disposed on the second locking part 36. The guiding rail and the guiding groove work in conjunction in order to securely connect the cover 2 with the battery base 3.

The first locking part 22 and the second locking part 36 of the present disclosure engage each other, enabling the cover 2, the seal piece 23 and the battery base 3 to be connected as one body. When the user opens the cover 2, the battery base 3 can be pulled out in conjunction with the cover 2, facilitating the replacing of battery 32 within the battery base 3.

The present disclosure includes the main rod 1, the cover 2, the battery base 3, and the control circuit board 4 in which the components are designed for simple assembly and low production cost. The cover 2 and the battery base 3 are connected to each other by a simple engagement method, and are simple and convenient to install.

The connection between the cover 2 and the battery base 3 of the present disclosure is completely hermetic at one end (the top end) of the main rod 1, does not have any aperture, and a seal piece 23 can be disposed within the cover, thereby possessing ideal sealing and water proof effects.

Operation of the present disclosure only requires the cover 2 to be turned for about 4 to 6 seconds in order to promptly pull the battery base 3 connected to the cover 2 out of the main rod 1, achieving the object of promptly replacing the battery.

Second Embodiment

Figure 1:
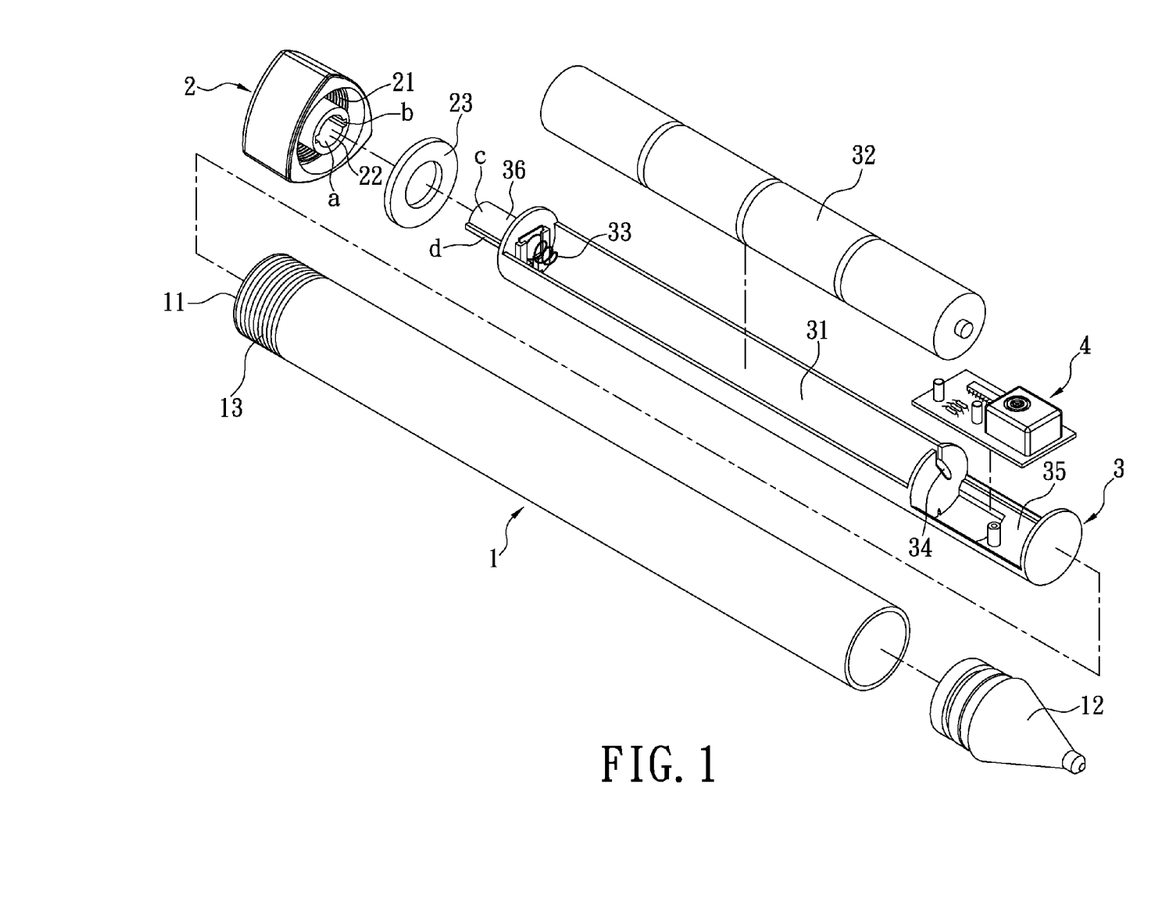
FIG. 1 shows a perspective exploded diagram of a first embodiment of the present disclosure.
Figure 2:
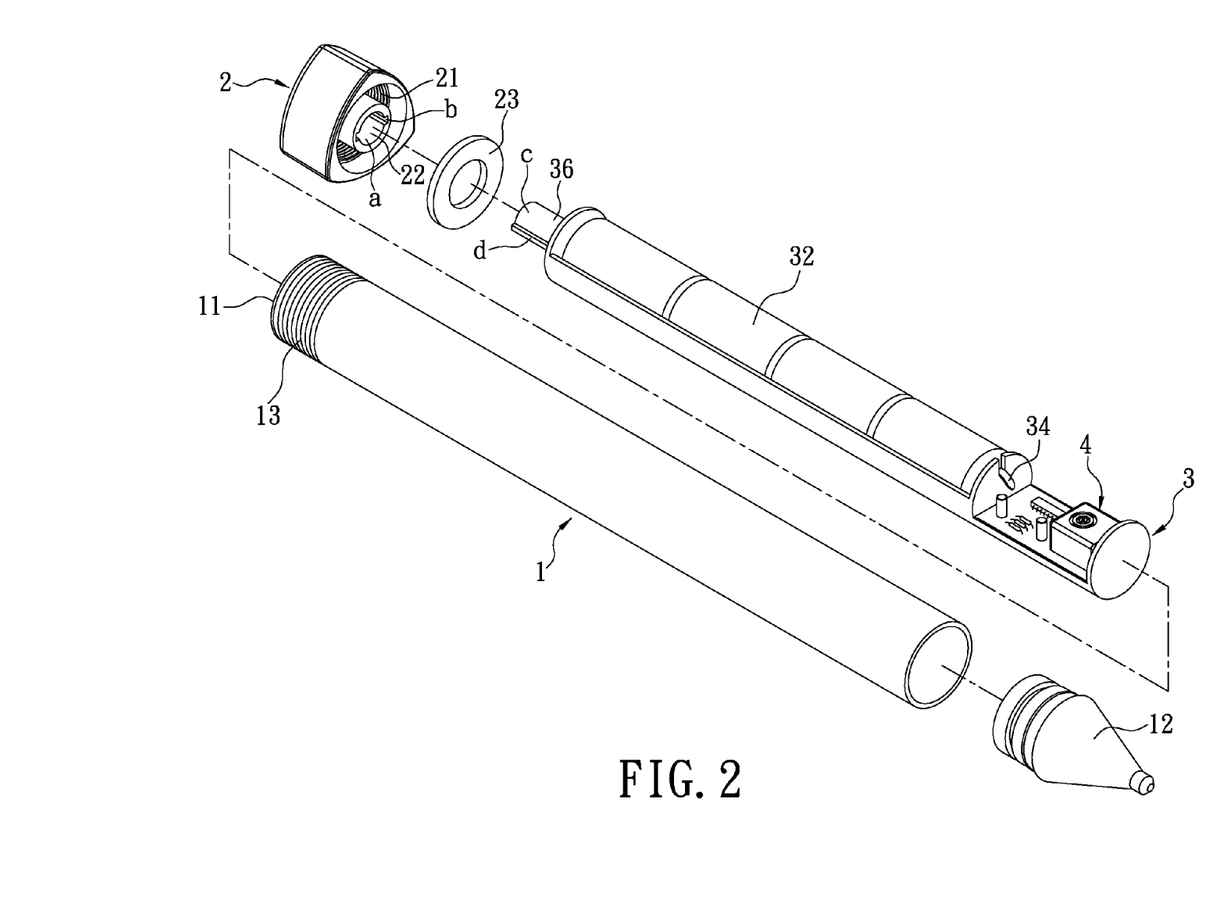
FIG. 2 shows another perspective exploded diagram of a first embodiment of the present disclosure.
Figure 3:
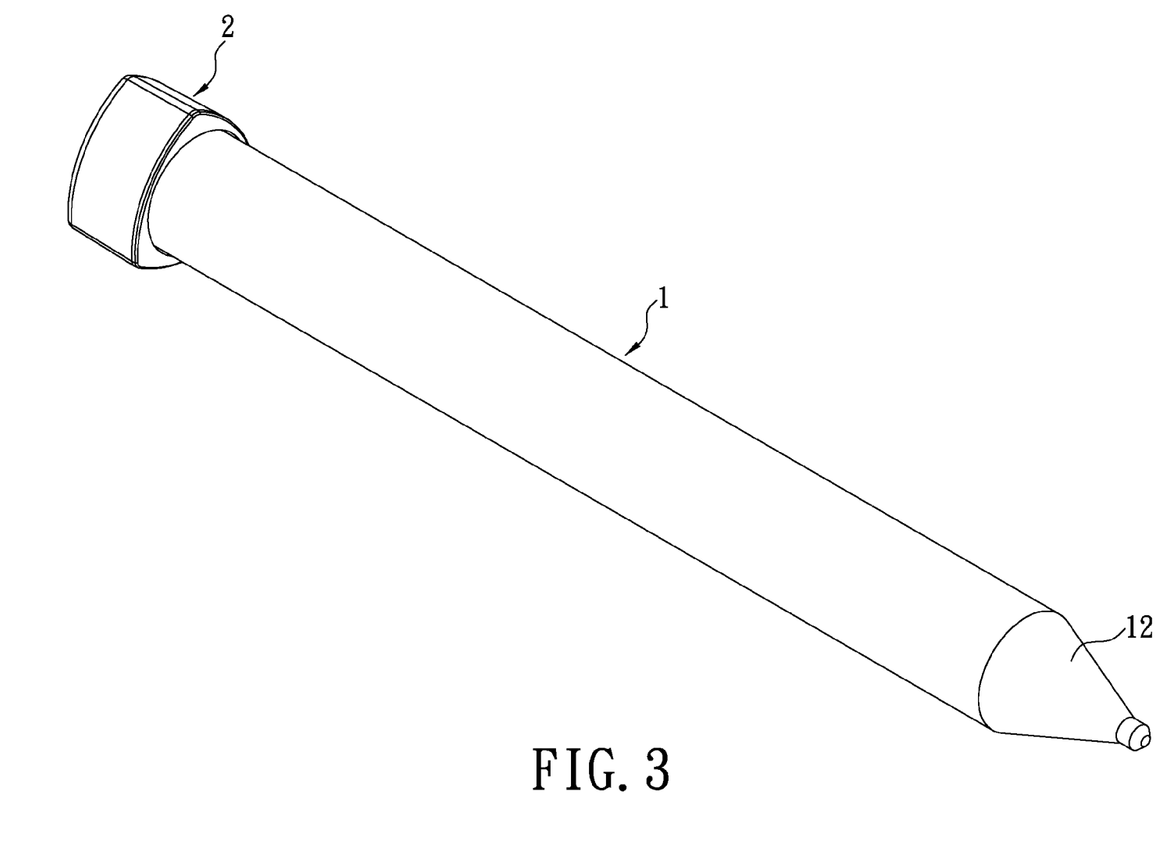
FIG. 3 shows a perspective diagram of an appearance of a first embodiment of the present disclosure.
Figure 4:
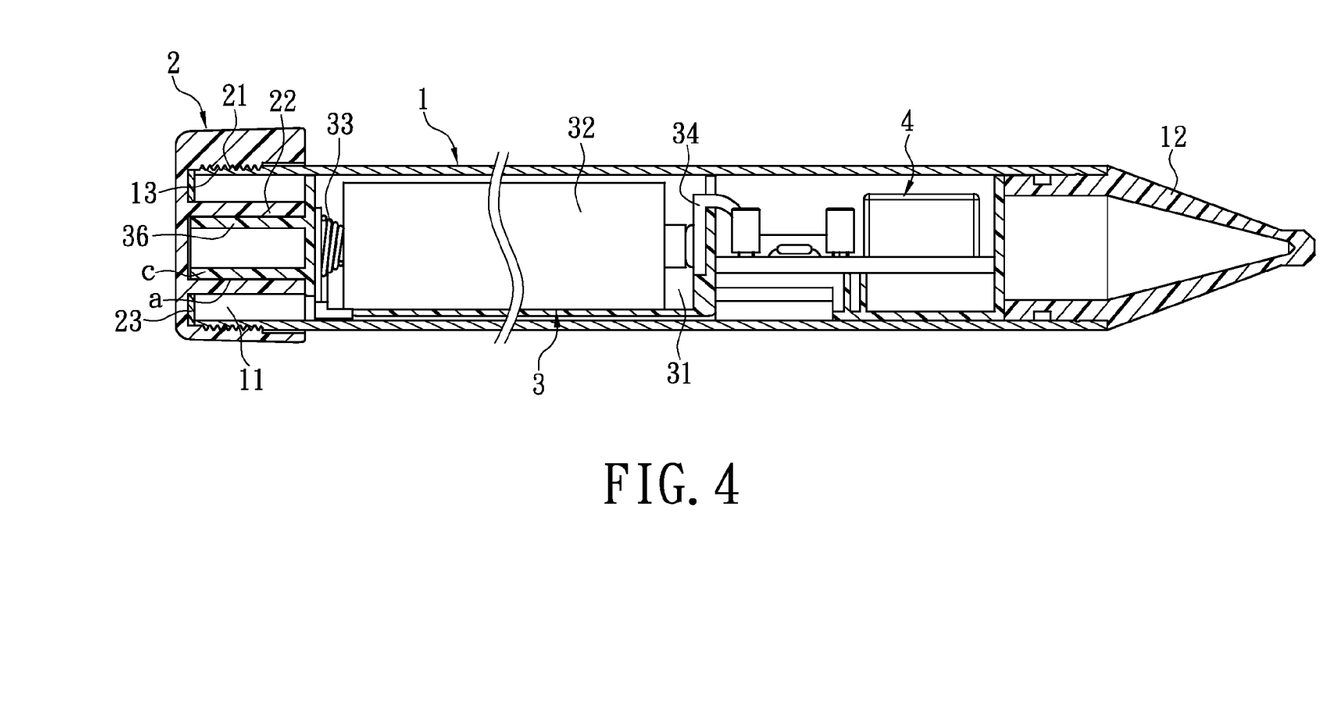
FIG. 4 shows a cross-sectional diagram of a first embodiment of the present disclosure.
Figure 5:
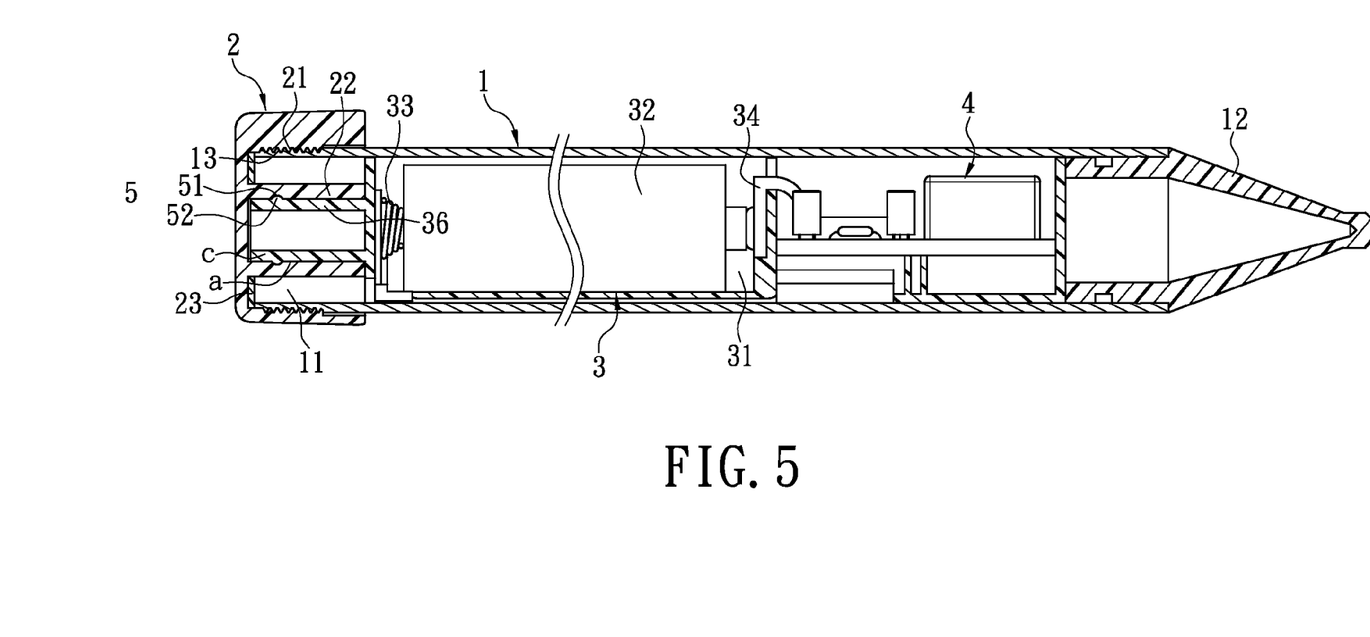
FIG. 5 shows a cross-sectional diagram of a second embodiment of the present disclosure.

Referring to FIG. 5, in the present embodiment, a retaining structure 5 is further disposed between the first locking part 22 and the second locking part 36, for retaining the first locking part 22 to the second locking part 36. The retaining structure 5 can include a concave part 51 disposed on the first locking part 22 and a convex part 52 disposed on the second locking part 36. The concave part 51 and the convex part 52 engage with each other, for providing a retaining by engagement effect such that the cover 2 can be securely connected to one end of the battery base 3. In another embodiment, the retaining structure 5 includes a convex part of the first locking part 22 (not shown in the figure) and a concave part of the second locking part 36 (not shown in the figure). The convex part and the concave part engage with each other, likewise achieving a retaining by engagement effect.

Third and Fourth Embodiments

Figure 6:
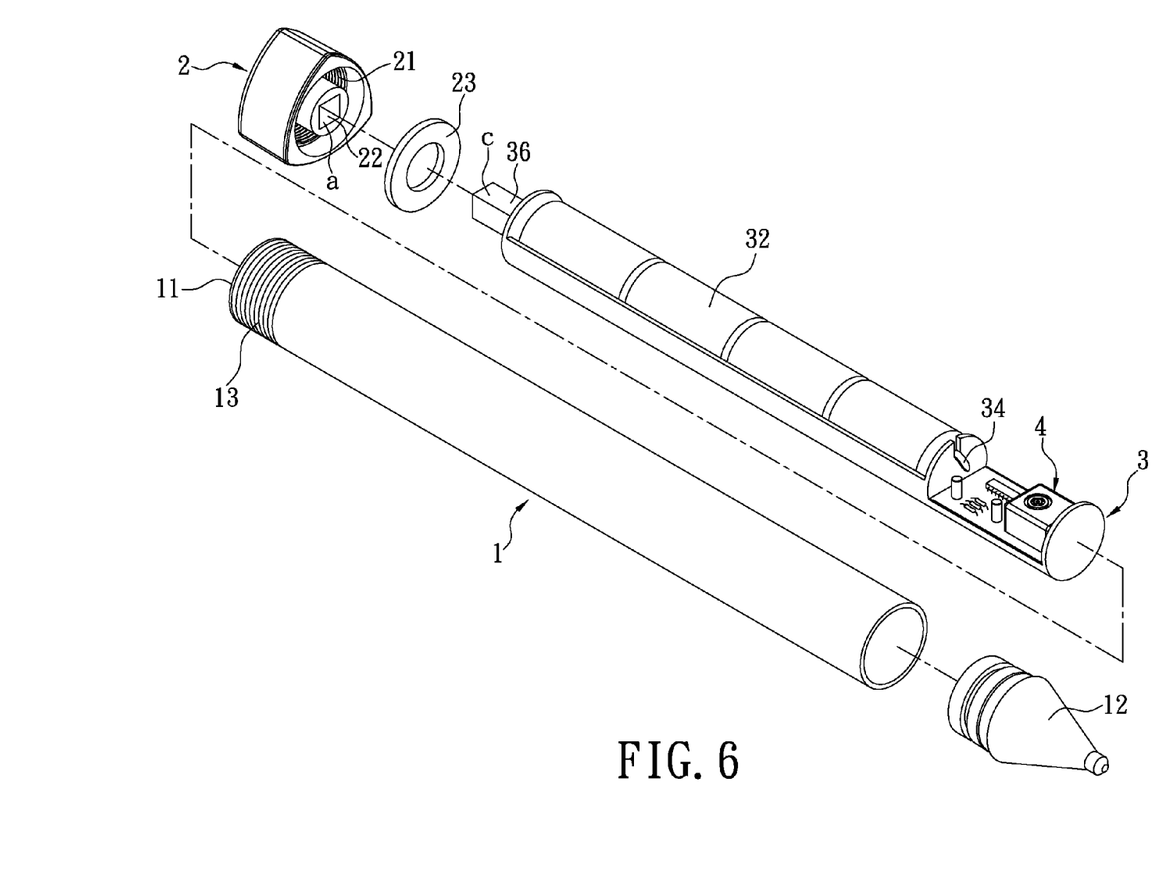
FIG. 6 shows a perspective exploded diagram of a third embodiment of the present disclosure.
Figure 7:
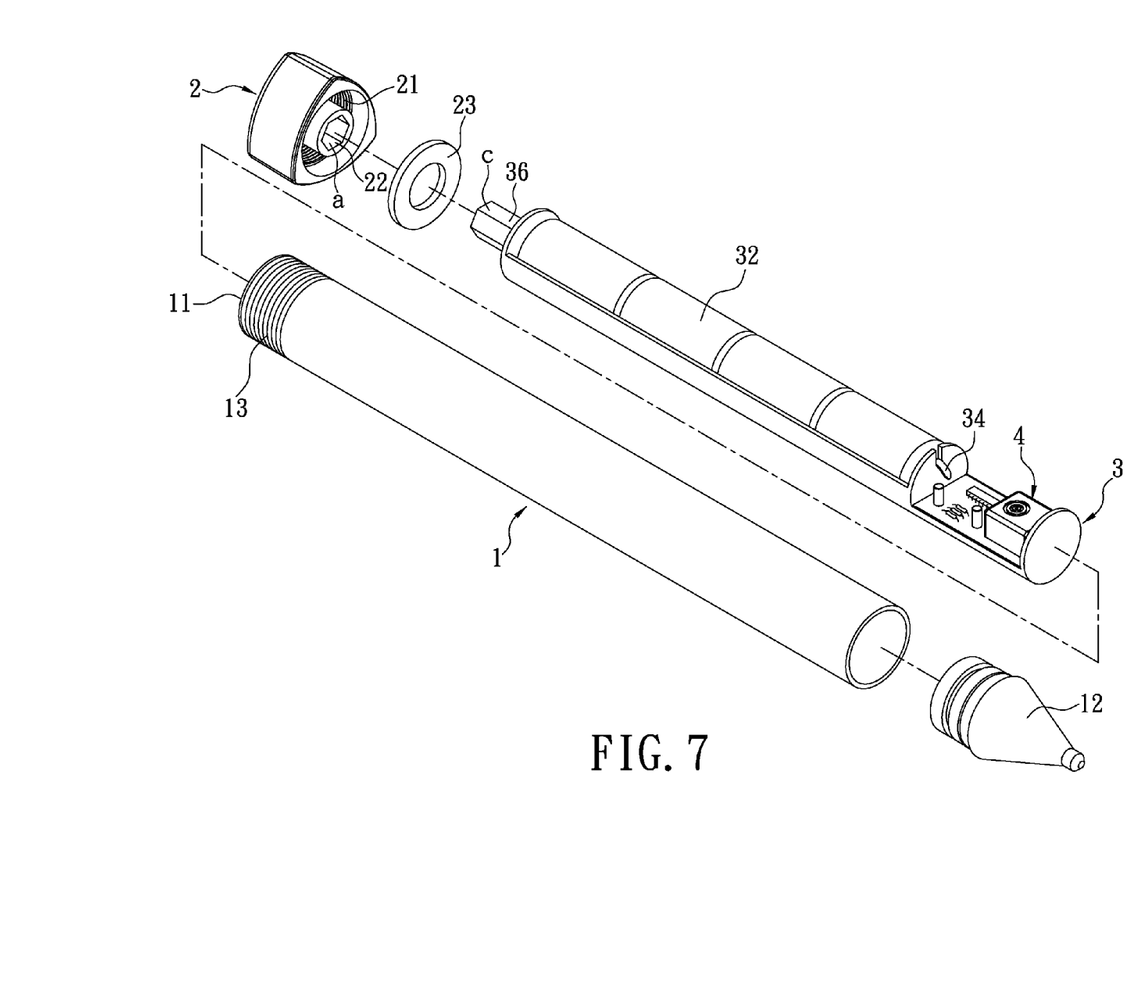
FIG. 7 shows a perspective exploded diagram of a fourth embodiment of the present disclosure.

Referring to FIG. 6 and FIG. 7, the present embodiments disclose that the first locking part 22 is a locking groove A with the shape of a polygonal cylinder (such as a tetragonal, pentagonal, or hexagonal cylinder). The present embodiments disclose that the second locking part 36 is a locking body C with the shape of a polygonal cylinder (such as a tetragonal, pentagonal, or hexagonal cylinder). The first locking part 22 (locking groove A) of the cover 2 and the second locking part 36 (locking body C) of the battery base 3 engage with each other, such that the cover can be connected by engagement to one end of the battery base 3.

The descriptions illustrated supra set forth simply the preferred embodiments of the present invention; however, the characteristics of the present invention are by no means restricted thereto. All changes, alternations, or modifications conveniently considered by those skilled in the art are deemed to be encompassed within the scope of the present invention delineated by the following claims.

What is claimed is:

1. A ground rodent repeller, comprising:
    a main rod having an opening and a first screw thread disposed on one end thereof;
    a cover having a first locking part and a second screw thread threadedly coupled to the first screw thread;
    a battery base disposed within the main rod, having a second locking part disposed on one end thereof wherein the first locking part of the cover and the second locking part of the battery base are mutually engaged; and
    a control circuit board disposed on the battery base.

2. The ground rodent repeller according to claim 1, wherein the cover has a seal piece disposed therein and an end of the main rod presses against the seal piece such that the seal piece is sandwiched between the cover and the main rod.

3. The ground rodent repeller according to claim 1, wherein the first screw thread is a thread type selected from the group consisting of a male thread and a female thread and the second screw thread is a thread type selected from the group consisting of a female thread and a male thread.

4. The ground rodent repeller according to claim 1, wherein the first locking part is a part selected from the group consisting of a locking groove and a locking body, and the second locking part is a part selected from the group consisting of a locking body and a locking groove.

5. The ground rodent repeller according to claim 1, wherein a retaining structure is disposed between the first locking part and the second locking part, for retaining the first locking part and the second locking part.

6. The ground rodent repeller according to claim 5, wherein the retaining structure comprises a concave part arranged on the first locking part and a convex part arranged on the second locking part, and the concave part and the convex part are mutually engaged.

7. The ground rodent repeller according to claim 5, wherein the retaining structure comprises a convex part arranged on the first locking part and a concave part arranged on the second locking part, and the convex part and the concave part are mutually engaged.

8. The ground rodent repeller according to claim 1, wherein the battery base has a battery compartment in which conduction pieces are disposed on two ends thereof, the conduction pieces are electrically connected to the control circuit board, the battery compartment has an accommodating space, and the control circuit board is disposed within the accommodating space.

9. The ground rodent repeller according to claim 1, wherein the first locking part has a guiding groove, the second locking part has a guiding rail, and the guiding groove and the guiding rail engage with each other.

10. The ground rodent repeller according to claim 1, wherein the first locking part has a guiding rail, the second locking part has a guiding groove, and the guiding rail and the guiding groove engage with each other.

\* \* \* \* \*